US009819892B2

(12) United States Patent
Latremouille et al.

(10) Patent No.: US 9,819,892 B2
(45) Date of Patent: Nov. 14, 2017

(54) ERROR CORRECTION DATA IN A VIDEO TRANSMISSION SIGNAL

(71) Applicant: Semtech Canada Corporation, Burlington (CA)

(72) Inventors: Damien Latremouille, Ottawa (CA); Yann Deslauriers, Gatineau (CA); Chad Erven, Ottawa (CA); Francois Tremblay, Gatineau (CA)

(73) Assignee: Semtech Canada Corporation (CA)

(*) Notice: Subject to any disclaimer, the term of this patent is extended or adjusted under 35 U.S.C. 154(b) by 10 days.

(21) Appl. No.: 15/089,660

(22) Filed: Apr. 4, 2016

(65) Prior Publication Data
US 2016/0344970 A1    Nov. 24, 2016

Related U.S. Application Data

(60) Provisional application No. 62/164,785, filed on May 21, 2015.

(51) Int. Cl.
*H04N 5/38* (2006.01)
*G11B 27/10* (2006.01)

(52) U.S. Cl.
CPC .............. *H04N 5/38* (2013.01); *G11B 27/10* (2013.01)

(58) Field of Classification Search
CPC ........ H04N 5/38; H04N 5/44; H04N 5/44508; H04N 3/24; H04N 3/405; H04N 7/025; H04N 7/0806; H04N 7/0115; H04N 7/083; H04N 7/084; H04N 2005/91357; H04N 9/3179; G11B 27/10

USPC ....... 348/723, 746, 747, 636, 668, 680, 682, 348/490, 693, 531, 423.1, 429.1, 430.1, 348/434.1, 474, 479
See application file for complete search history.

(56) References Cited

U.S. PATENT DOCUMENTS

| | | | | |
|---|---|---|---|---|
| 4,665,431 A * | 5/1987 | Cooper | .................. | H04N 7/084 348/473 |
| 5,208,666 A * | 5/1993 | Elkind | .................... | H04N 19/89 348/192 |
| 5,239,582 A * | 8/1993 | Griesshaber | ......... | H04N 7/1696 348/E7.059 |
| 5,583,574 A * | 12/1996 | Tanaka | .................... | H04N 11/04 348/479 |
| 5,737,026 A * | 4/1998 | Lu | .......................... | H04N 7/025 348/460 |
| 6,040,870 A * | 3/2000 | Small | ..................... | H04N 7/025 348/434.1 |
| 6,055,020 A * | 4/2000 | Lorenz | ..................... | H04N 7/08 348/473 |
| 6,064,440 A * | 5/2000 | Born | ...................... | H04N 7/088 348/461 |
| 6,211,919 B1 * | 4/2001 | Zink | ....................... | H04J 13/00 348/461 |
| 6,295,093 B1 * | 9/2001 | Park | ..................... | H04N 5/278 348/468 |

(Continued)

*Primary Examiner* — Jefferey F Harold
*Assistant Examiner* — Mustafizur Rahman
(74) *Attorney, Agent, or Firm* — Jones Day (57) ABSTRACT

A transmitter transmits a raster-type video signal. For each one of a plurality of active video segments of a frame of the video signal, the transmitter derives redundant data from the respective active video segment and inserts the redundant data into a horizontal blanking segment of the video signal.

16 Claims, 6 Drawing Sheets

(56) References Cited

U.S. PATENT DOCUMENTS

| | | | | |
|---|---|---|---|---|
| 6,556,247 | B1* | 4/2003 | Ranta | H04N 21/43637 348/460 |
| 6,636,268 | B1* | 10/2003 | Ngai | H04N 7/025 348/461 |
| 7,057,666 | B2* | 6/2006 | Folio | H04N 7/08 348/473 |
| 8,090,200 | B2* | 1/2012 | Barletta | G06F 17/30802 382/168 |
| 2002/0047921 | A1* | 4/2002 | Folio | H04N 7/025 348/473 |
| 2005/0006577 | A1* | 1/2005 | Fuhrer | H01J 49/0036 250/287 |
| 2009/0276118 | A1* | 11/2009 | Shen | H04N 21/23431 701/33.4 |
| 2010/0299576 | A1* | 11/2010 | Baysah | G06F 11/1044 714/763 |
| 2011/0157479 | A1* | 6/2011 | Higuchi | H04L 12/4625 348/734 |
| 2012/0008044 | A1* | 1/2012 | Nagata | H04N 5/445 348/478 |
| 2015/0095481 | A1* | 4/2015 | Ohnishi | H04L 1/004 709/223 |

\* cited by examiner

ERROR CORRECTION DATA IN A VIDEO TRANSMISSION SIGNAL

CROSS-REFERENCE TO RELATED APPLICATION

This application claims priority from U.S. Provisional Application No. 62/164,785, filed May 21, 2015, hereby incorporated herein by reference.

TECHNICAL FIELD

The technology described herein relates to including error correction data in video signals that have blanking intervals.

BACKGROUND

Video signals may include blanking intervals, such as horizontal blanking intervals and vertical blanking intervals. Blanking intervals are located between active video segments, of the video signal, which contain video content for display. But the blanking intervals themselves do not include video content for display.

In digital video transmission systems, image, audio and other data are formatted according to well established standards. However, some of these standards make only very limited provisions for the detection and correction of transmission errors within the system. Therefore, these systems are vulnerable to impairments caused by increasing data rates and/or increased transmission distances. Errors in transmission ultimately degrade the image quality at the receiver, corrupt ancillary data and can cause the receiver to lose video timing synchronization.

Certain characteristics of a video system, such as transmission distance, quality of the transmission channel, operational environments or data rates directly affect the probability and rate of errors at the receiver. In turn, the overall error rate directly affects the image quality, the data integrity of the ancillary data and the video timing synchronization of the transmitted video signal. Thus it becomes increasingly difficult to maintain constant video quality over increasing transmission distances and at the higher data rates demanded by newer video standards.

Figure 1:
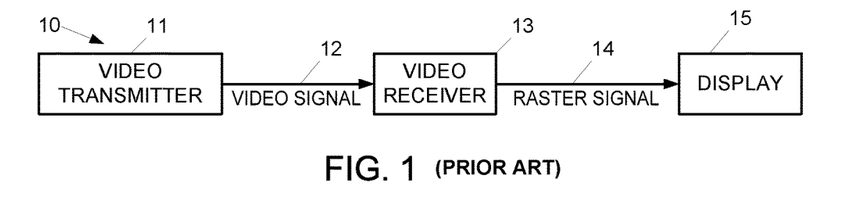
FIG. 1 is a schematic diagram of a prior art video communication system that includes a transmitter, a receiver and a display.

FIG. 1 is a schematic diagram of a prior art video communication system 10. The system 10 includes a video transmitter 11 that transmits a video signal 12 to a video receiver 13. The receiver 13 generates, from the transmitted video signal 12, a raster signal 14, which can be analog, that is channeled to a display screen 15, such as a cathode ray tube of an analog television.

For historic reasons, modern digital video systems have frame structures that retain properties of the analog video systems that they replaced. A video signal is broken up into several different components for transmission. Each transmitted image frame is first broken into horizontal lines (scan lines), transmitted from left to right, top to bottom. In older cathode ray tube technologies, it was necessary to disable the electron beam (called blanking) after drawing a scan line in order to return the beam to the left side of the display.

Figure 2:
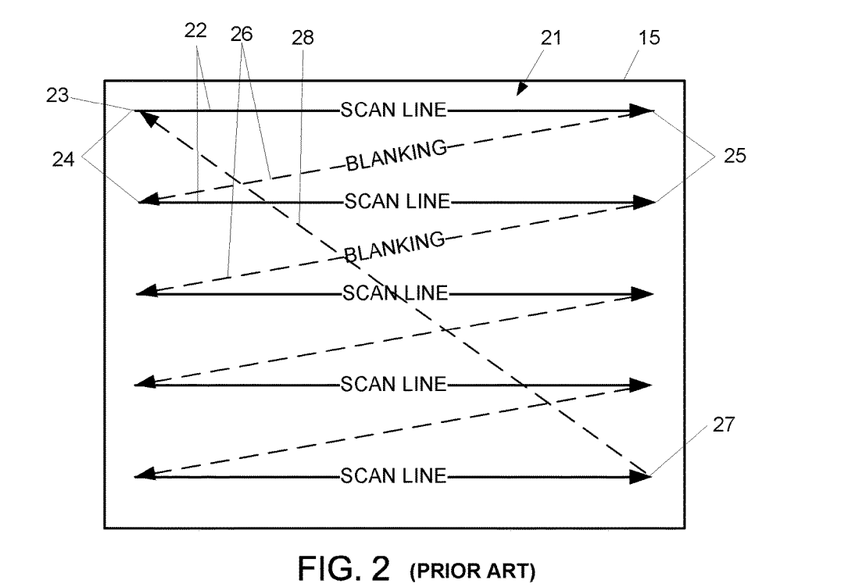
FIG. 2 is a diagram illustrated a video frame generated on the display of FIG. 1.

FIG. 2 is a schematic diagram of a video frame 21 (image) that is displayed by the display screen 15. The frame 21 comprises a vertically-extending series of horizontal lines 22 (scan lines). To generate the frame 21, a beam of the cathode ray tube starts by impinging a screen phosphor at the top left corner 23 of the frame 21 (and of the display 15) and generates the successive horizontal lines 22 in a zigzag fashion. Each scan line 22 is generated from the left end 24 of the scan line 22 to the right end 25 of the scan line 22, and is followed by a horizontal blanking interval 26 of time during which the beam is turned off (disabled, blanked) while it returns to the left end 24 of the frame 21 to start the next scan line 22. After the beam reaches the bottom right corner 27 (rightmost end of the last horizontal line) of the frame 21, there is a vertical blanking interval 28 of time during which the beam returns to the top left corner 23 of the frame 21 (screen 15) to start producing the next frame in the video signal 12.

Figure 3:
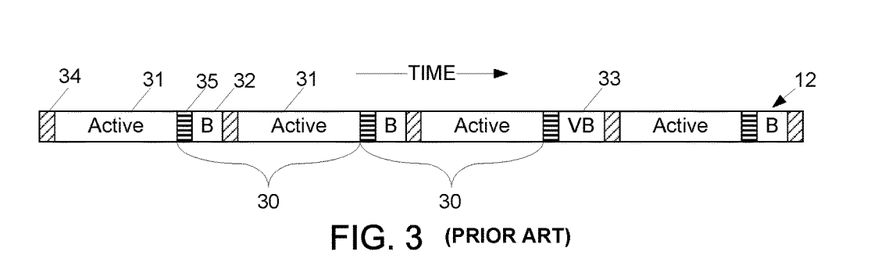
FIG. 3 is a diagram of a video signal transmitted by the transmitter of FIG. 1 to generate the video frame of FIG. 2.

FIG. 3 is a schematic diagram of the transmitted signal 12. In this diagram, time increases from left to right, as indicated by an "time" arrow above the diagram pointing to the right. The transmitted signal 12 includes a series (succession) of video lines 30, one for each scan line 22 of video. Each video line 30 includes an active video segment 31 (video content segment) that contains data defining how the respective scan line 22 is to be rendered on the screen 15, and a horizontal blanking segment 32. Accordingly, neighboring active video segments 31 are separated by one of the blanking segments 32, and the blanking segments 32 are interspersed among the active segments 31. The transmitted signal 12 includes a vertical blanking segment 33 temporally located between one frame's data and the next frame's data. Accordingly, data for neighboring frames are separated by a vertical blanking segment 33. The active video segments 31, horizontal blanking segments 32 and vertical blanking segments 33 shown in FIG. 3 are temporally aligned respectively with the frame's scan line 22, horizontal blanking intervals 26 and vertical blanking interval 28 shown in FIG. 2.

In the transmitted signal 12 in FIG. 3, each active video segment 31 is immediately preceded by a start of active video (SAV) segment 34 and immediately followed by an end of active video (EAV) segment 35. Alternatively stated, each horizontal blanking segment 32 is immediately preceded by an EAV segment 35 and immediately followed by a SAV segment 34. The SAV and the EAV together comprise a timing reference signal (TRS).

One example of the receiver 13 is an analog television that receives the raster-based video signal 12 illustrated in FIG. 3 and renders images (frames) on a cathode ray tube using the raster-based procedure illustrated in FIG. 2. Another example of the receiver 13 is a digital video receiver, such television with a flat screen LED-based or LCD-based display, that receives the raster-based signal 12 described above, and renders the images (frames) on a display using a procedure other than the raster scan procedure described above, and therefore does not require a horizontal or vertical blanking interval for enabling a beam to return to a prior location, but requires the blanking intervals instead for proper signal formatting. With either type of receiver (i.e., with cathode ray tube and without), the rate of errors in the signal arriving at the receiver increases as data rate and transmission distance increase.

SUMMARY

Examples of systems and methods for providing error correction data in a video transmission signal are provided. A transmitter transmits a raster-type video signal. For each one of a plurality of active video segments of a frame of the video signal, the transmitter derives redundant data from the respective active video segment, as well as from ancillary and audio data that may be contained in the video signal's blanking space, and inserts the redundant data into a horizontal blanking segment of the video signal.

DETAILED DESCRIPTION

Figure 4:
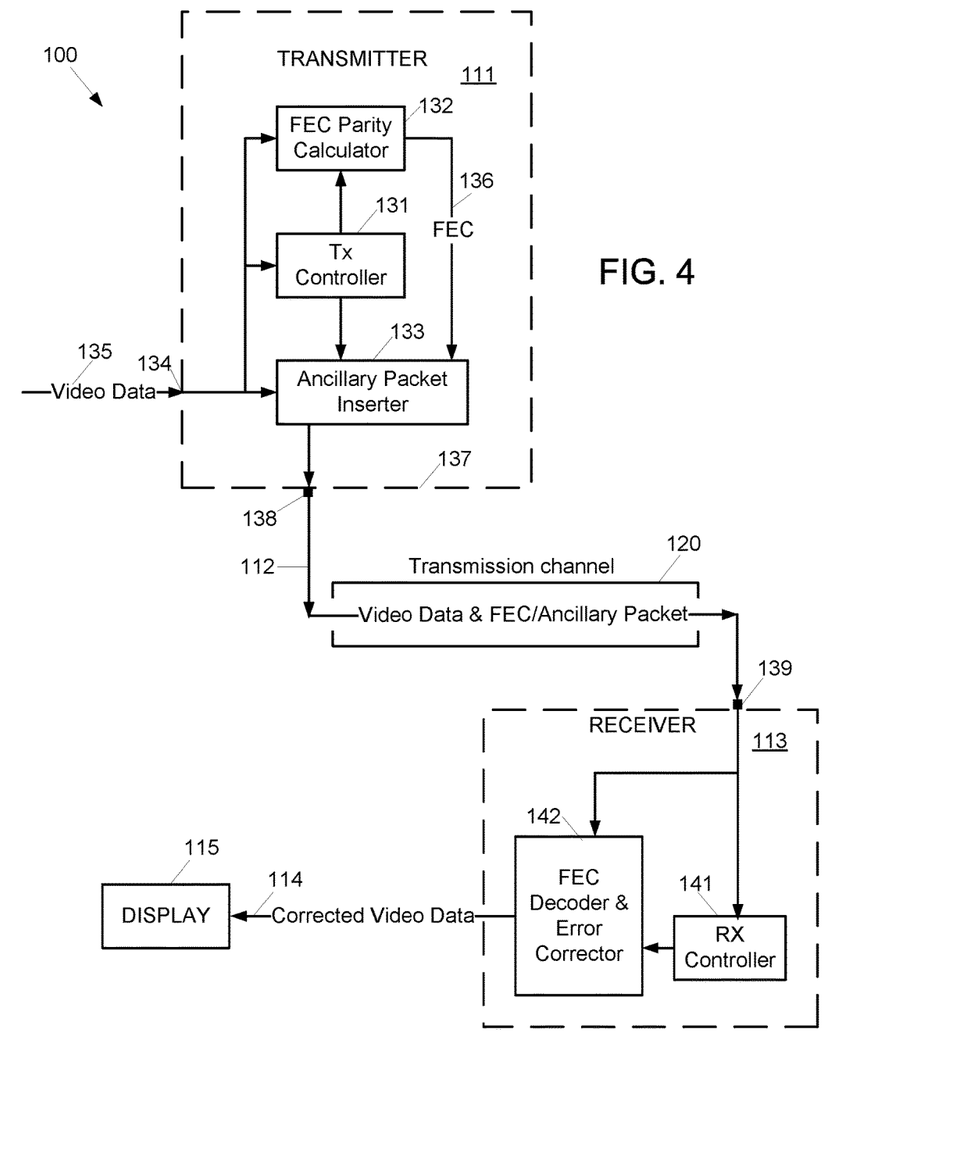
FIG. 4 is a schematic diagram of an example video communication system, including a transmitter and a receiver, in accordance with the present invention.

FIG. 4 is a block diagram of an example video communication system 100 for providing error correction data in a video transmission signal. The system 100 includes a video transmitter 111 that transmits a video signal 112 through a transmission medium 120 (transmission channel) to a video receiver 113. The receiver 13 generates, from the transmitted video signal 112, a signal 114 (e.g., raster signal) that is channeled to a display screen 115. The signal 112 acquires noise from the transmission medium 120. The transmitter 111 generates forward error correction (FEC) data for the video signal, and inserts the FEC data into blanking segments of the video signal, for the receiver 113 to use to correct the errors.

The transmitter 111 includes a transmission (Tx) controller 131, an FEC parity calculator 132 and an ancillary packet inserter 133. An input 134 of the transmitter 111 inputs video data 135, to be received by all three components 131, 132, 133 of the transmitter 111.

The Tx controller 131 tracks the incoming video data 135 to be FEC protected and coordinates the FEC parity calculation and its insertion in the horizontal blanking segment of a video signal. The transmission controller 131 performs a number of functions including: enable/disable parity calculation, enable/disable parity insertion, control timing, determining what video data is included in parity calculation, location of the inserted parity within the video blanking time, etc. Results of the transmission controller 131 are channeled to both the FEC parity calculator 132 and the ancillary packet inserter 133.

The FEC parity calculator 132 receives both the video data 135 and a control signal from the transmission controller 131, to generate the FEC parity data 136 required to protect the video signal 112 from transmission errors. The choice of error correcting code, used by the FEC parity calculator 132, may depend on any number of system constraints, for example required coding gain, encoding/decoding complexity, operating environment, etc.

The ancillary packet inserter 133 receives a control signal from the transmission controller 131, an output from the FEC parity calculator 132, and the video data 135. The ancillary packet inserter 133 converts the FEC parity data 136 into an appropriate format for proper transmission within the horizontal blanking segment of the video signal 135. The FEC data 136 is inserted in an unused portion of the horizontal blanking segment and in a format that can be reliably extracted by the receiver 113 from the video signal, to yield the output video signal 112.

The output video signal 112 is transmitted from an output 138 of the transmitter 111, through the transmission channel 120, to an input 139 of the receiver 113. Examples of the transmission channel 120 include wireless transmission medium and wired transmission medium. Examples of wired transmission medium include fiber optic cable, copper medium, electrical (e.g., coax) cable and twisted wire pair. Examples of the transmitter output 138 and the receiver input 139 include cable connectors and antennas. During transmission (propagation), the signal 112 acquires noise from the transmission medium 120 (transmission channel).

The receiver 113 includes a receiver (Rx) controller 141 and an FEC Decoder & Error Corrector (FEC/EC) 142. The receiver (Rx) controller 141 receives the transmitted video signal 112 (incoming video signal) and searches the signal 112 to identify and extract data required to properly decode the embedded FEC codes. This includes identifying the blanking segment and locating the FEC parity data within the blanking segment. The Rx controller 141 also synchronizes the FEC decoder 142 with the received video signal 112 to ensure that the parity verification matches the transmitted parity calculation.

The FEC/EC 142 receives both the incoming signal 112 and a control signal from the Rx controller 141. The FEC data is used by the FEC/EC 142 to verify the incoming FEC parity data and to determine if an error has occurred in transmission. The FEC/EC 142 uses an algorithm appropriate to the implemented error correcting code to determine if and where transmission errors have occurred in the video signal. Once errors have been identified, the FEC/EC 142 modifies the received data 112 to correct the detected errors. The output 114 of the FEC/EC 142 includes the video content of the incoming signal 112, but with errors corrected.

Each module 131, 132, 133 (block) of the transmitter 111 might be a specific circuit, or portion of a circuit, configured to implement the respectively corresponding function. Alternatively, the modules 131, 132, 133 might be implemented by software, and executed by one or more processors. The transmitter 111 might include a non-transitory computer readable (processor readable) medium (memory) that stores software instructions configured to be executed by a processor (which might include multiple processors) of the transmitter 111 to perform the functions 131, 132, 133 of the transmitter 11.

Similarly, each module 141, 142 (block) of the receiver 113 might be a specific circuit, or portion of a circuit, configured to implement the respectively corresponding function. Alternatively, the modules 141, 142 might be implemented by software, and executed by one or more processors. The receiver 113 might include a non-transitory computer readable (processor readable) medium (memory) that stores software instructions configured to be executed by a processor (which might include multiple processors) of the receiver 113 to perform the functions of the functions 141, 142 of the receiver 113.

The FEC parity calculator 132 functions as a redundant data deriver (redundant data deriving module) that derives (calculates in this example) the redundant data 136 (FEC data in this example) from the input video data 135. The packet inserter 133 inserts the redundant data 136 into the blanking segments of the input data 135.

Figure 5:
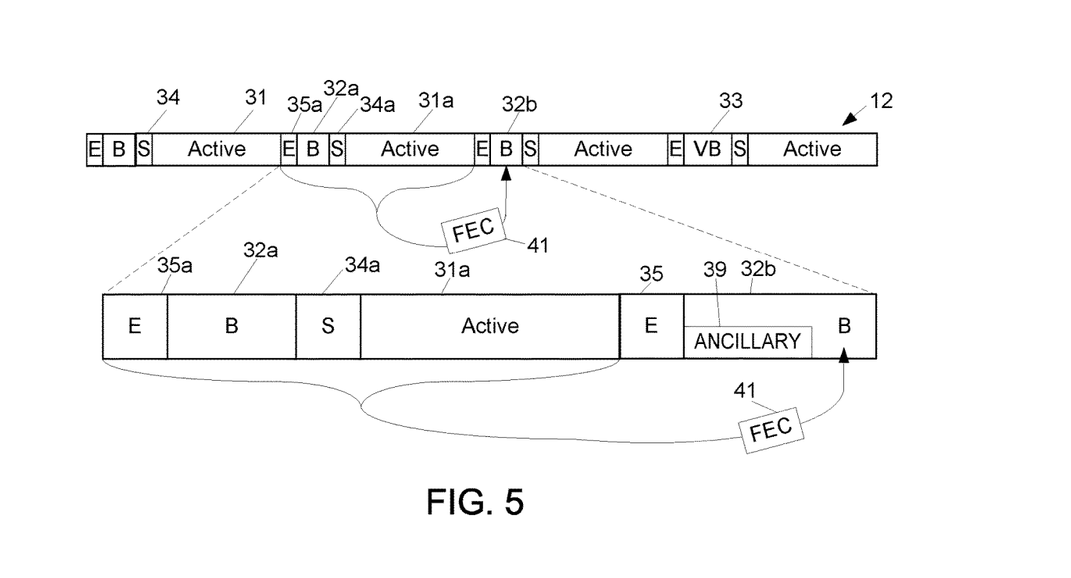
FIG. 5 is a diagram illustrating a process performed by the transmitter of FIG. 4.

FIG. 5 illustrates an example process performed by the example communication system 100 of FIG. 4. The transmitter 111 inserts ancillary data 39—i.e., data other than the active video content—into each horizontal blanking segment 32b. This inserted ancillary data 39 may augment other ancillary data that may have already been in the horizontal blanking segment 32b. Examples of the inserted ancillary data 39 include audio and close captioning. The ancillary data does not monopolize the entire blanking segment 32b, but instead leaves unused (spare) blanking bandwidth for additional data. The transmitter 111 inserts, in the spare bandwidth, information that is derived from and redundant to an active video segment 31a. The redundant information in this example is forward error correction (FEC) parity code that is calculated by the transmitter 11 and used by the receiver 13 to identify and correct transmission errors.

In the example of FIG. 5, the transmitter 111 derives (e.g., by calculating) FEC parity data 41 from (i) an active video segment 31a, (ii) a preceding SAV 34a, (iii) a preceding horizontal blanking segment 32a and (iv) a preceding EAV 35a. The transmitter 111 then inserts the calculated FEC data into the following horizontal blanking segment 32b after the ancillary data 30. Accordingly, in FIG. 5, the FEC data that is inserted in one blanking segment is derived from, among other things, ancillary data from a prior blanking segment.

Figure 6:
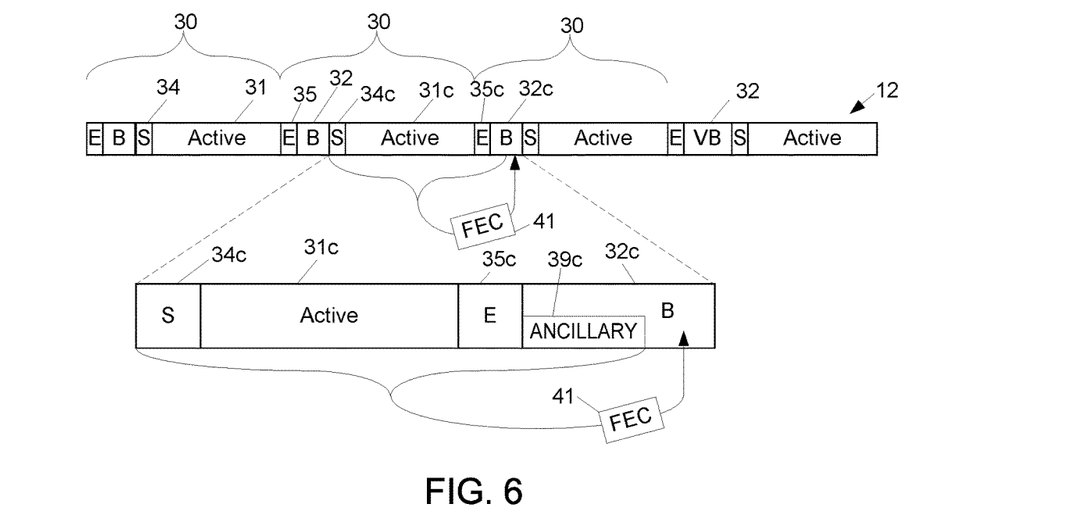
FIG. 6 is a diagram illustrating an alternative process performed by the transmitter of FIG. 4.

FIG. 6 illustrates another example, in which the transmitter 111 calculates (derives) FEC parity data 41 from (i) an active video segment 31c and (ii) its preceding SAV 34c and (iii) its following EAV 35c and (iv) ancillary data 39c in a subsequent horizontal blanking segment 32c. The transmitter 111 then inserts the calculated FEC data 41 into the same horizontal blanking segment 32c that holds the ancillary data 39c (audio, close captions, etc.) from which the FEC data was calculated.

Data used in the FEC calculation may be from anywhere in the video signal 12. For example, the FEC data may be derived from data that precedes and/or data that follows the blanking segment into which the FEC data is inserted. The data may be limited to a subset of the information contained in a line 30 of video data 12. For example, the FEC data may be derived from data (ancillary data) that is in the blanking segment and not from data in the active video segment. The FEC data inserted in a single blanking segment 32 may have been calculated from multiple active video segments 31. The FEC data inserted in a single blanking segment 32 may have been calculated from (i) data that precedes the blanking segment 32 and/or (ii) data that follows the blanking segment 32.

Figure 7:
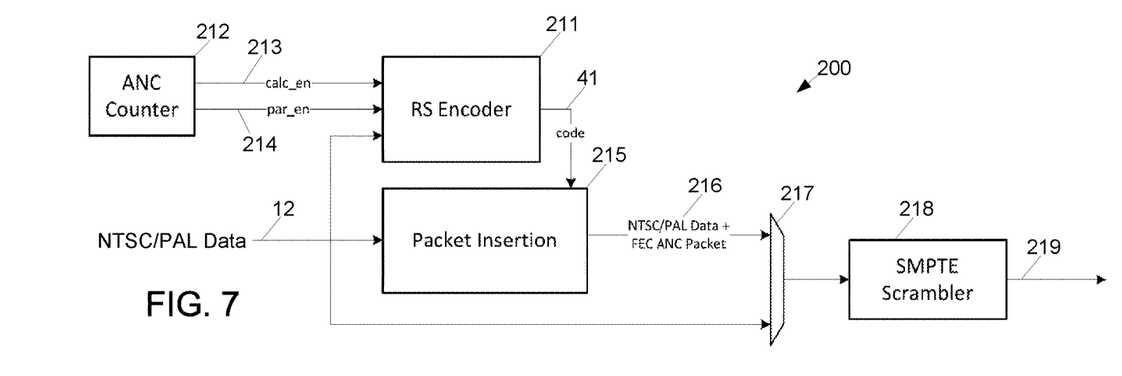
FIG. 7 is a schematic diagram of an example Reed Solomon (RS) forward error correction FEC encoder application performed by the transmitter of FIG. 4.

The transmitter 111 (FIG. 4) may use an example Reed Solomon (RS) FEC encoding circuit 200 shown in FIG. 7. In this example 200, an RS encoder 211 (corresponding to 132 in FIG. 4) calculates the FEC parity data 41 from the NTSC/PAL data signal 12. The encoder 211 also receives, from an ancillary (ANC) counter 212, a calculation enable 213 signal (calc en) and a parity enable signal 214 (par_en) to control timing of FEC calculation. A packet insertion 215 component inserts the FEC data (generated by the encoder 211) into horizontal blanking segments 32 (FIG. 6) of the video data signal 12. This yields a video/FEC combined signal 216 that is received by a multiplexer 217 that selects which signal, of the video signal 12 and the combined signal 216, is channeled to a SMPTE scrambler 218. The scrambler 218 scrambles the signal to reduce the likelihood that long strings of zeroes or ones will be present on the interface. Output 219 of the scrambler is transmitted over the transmission channel 120.

The encoding circuit 200 calculates RS parity to protect data in the video and ancillary spaces of a standard SMPTE NTSC/PAL video signal (where SMPTE is Society of Motion Picture and Television Engineers; NTSC is National Television System Committee; PAL is Phase Alternating Line). Video line data may, for example, be FEC protected using two symbol interleaved RS codes with corresponding parity calculation transmitted to the far end decoder in a standard ancillary packet.

Figure 8:
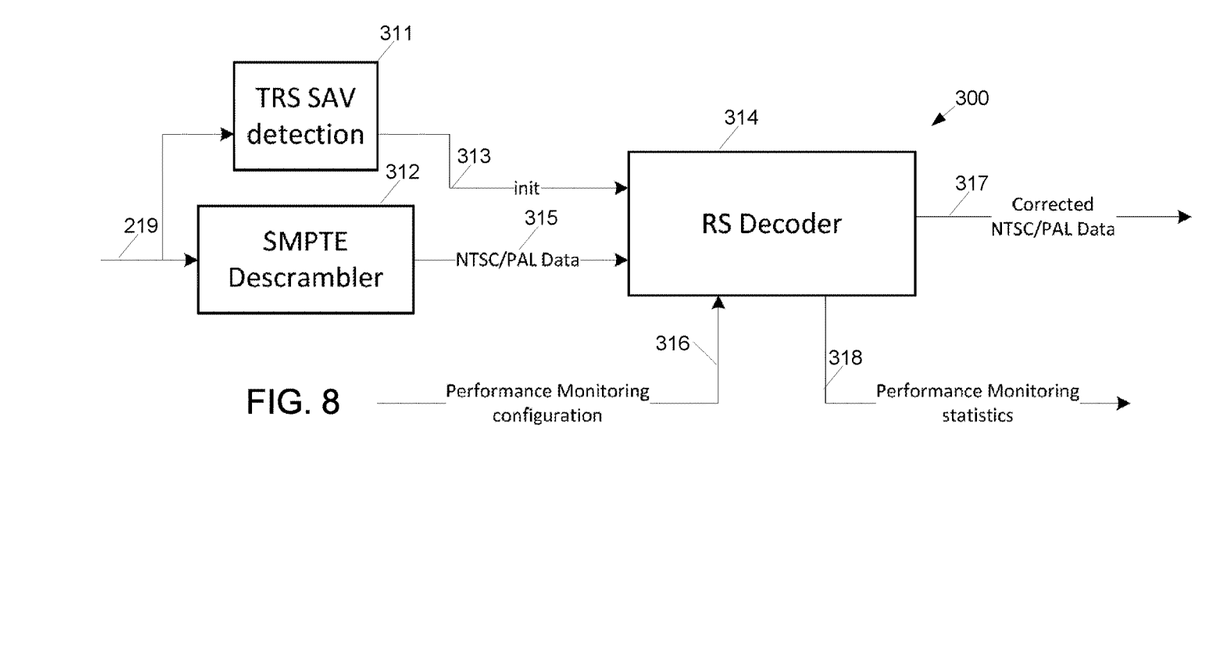
FIG. 8 is a schematic diagram of an example RS decoder application performed by the receiver of FIG. 4.

The receiver 113 (FIG. 4) may use an example RS decoding circuit 300 shown in FIG. 8. The example 300 includes TRS SAV detection 311 (where TRS is timing reference signal, and SAV is start active video) and SMPTE descrambler 312. Both components 311, 312 receive the incoming signal 219. The TRS SAV detection 311 provides an initialization signal 313 to a RS decoder 314. The descrambler 312 descrambles the incoming data signal 219 and outputs the descrambled data 315 to the decoder 314. The decoder 314 receives performance monitoring configuration data 316, accepts RS codewords, checks the corresponding parity and if possible, and corrects any detected errors in the received codewords. The decoder 314 corrects transmission errors in the video and ancillary spaces of a standard SMPTE NTSC/PAL video signal 315. The resulting corrected data 317 is output by the decoder 314 to the display 115 (FIG. 4). The decoder 314 also outputs performance monitoring statistics 318. Video line data is FEC protected using two symbol interleaved RS codes with corresponding parity calculation received in a standard ancillary packet.

Figure 9:
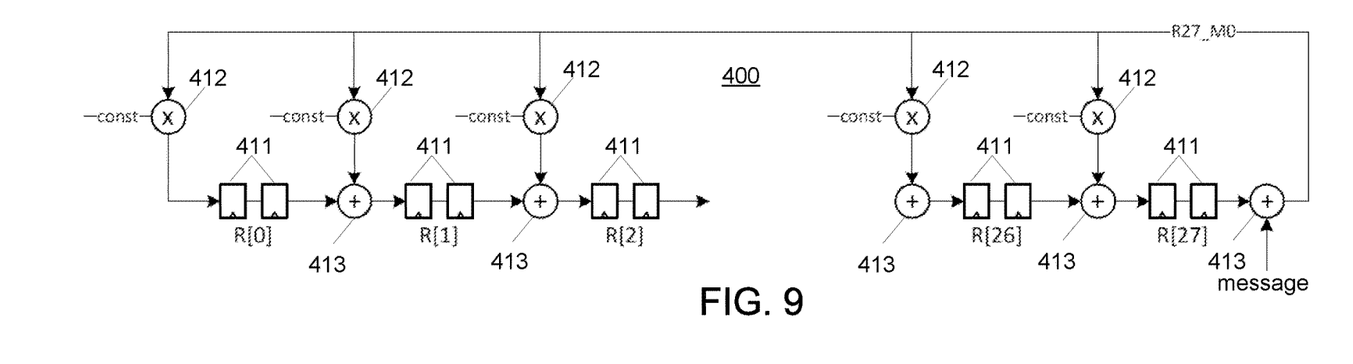
FIG. 9 is an example architecture of a RS encoder block shown in FIG. 7.

FIG. 9 shows an example architecture 400 for the RS encoder block 211 (of FIG. 7). The circuit 400 uses a series of flipflops 411, multipliers 412 and adders 413 to implement a symbol serial encoder using a standard linear feedback shift register (LFSR) structure to implement the polynomial division remainder calculation. The encoder architecture 400 includes a second set of remainder flipflops at each stage in the encoder LFSR. These flipflops are used to implement the distribution of incoming data into two separate remainder calculation in a symbol interleaved fashion. Thus only every other incoming message symbol is included in either set of remainders. Two sets of flipflops implement codeword interleaving and each set contains the running parity calculation for a single codeword.

Figure 10:
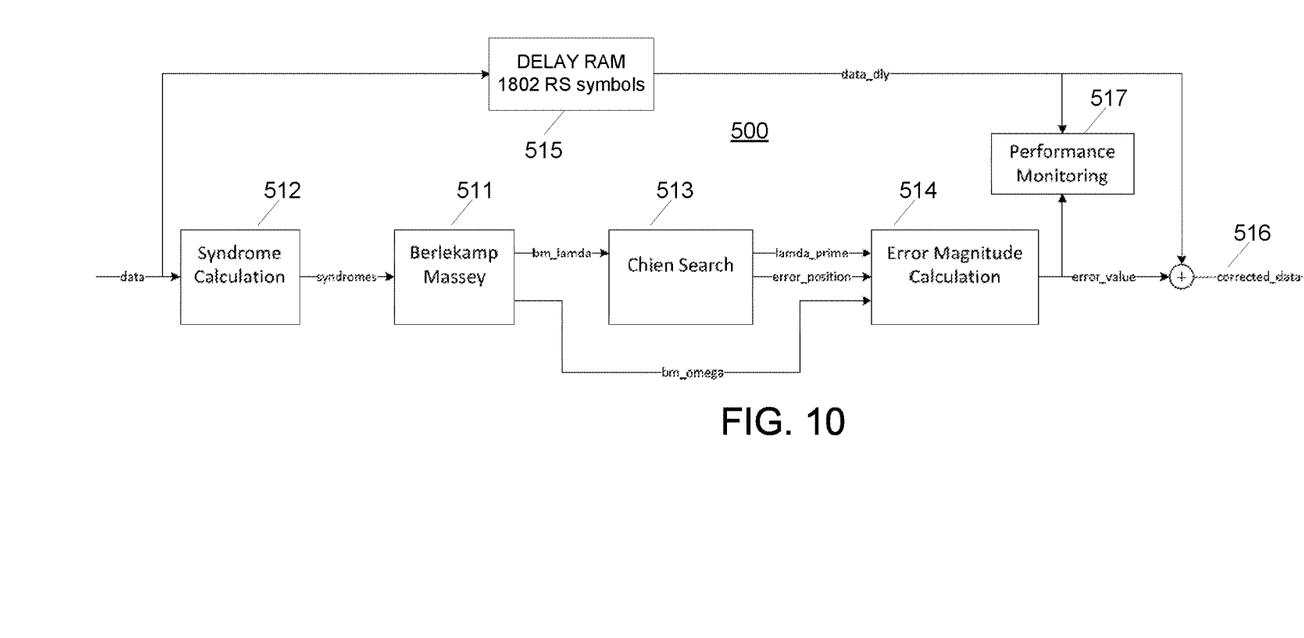
FIG. 10 is an example architecture of a RS decoder block shown in FIG. 8.

FIG. 10 shows an example architecture 500 for the RS decoder block 314 (FIG. 8). This architecture implements a Berlekamp-Massey based decoder 511. Syndrome calculation 512 is performed on incoming interleaved symbols. Solving the lambda polynomial and Chien searches 513 are performed sequentially (codeword 0 followed by codeword 1). An error magnitude circuit 514 works on both codewords simultaneously in a symbol interleaved manner in order to apply error corrections to interleaved data read from a delay RAM 515, yielding corrected data 516. Performance of the process is monitored 517.

During decoding illustrated in FIG. 10, all incoming data, including unprotected data, is stored in a data buffer FIFO until the decoder 314 (FIG. 8) is ready to apply error corrections. The size of the delay buffer is sized to match the decoding latency, in this case holding 1802 RS symbols.

Other example FEC protection schemes can be block codes in general and linear block codes in particular, such as Bose Chaudhuri Hocquenghem (BCH), Reed-Solomon (RS), and Hamming Codes. Yet other example codes that might be used are Turbo Codes and Low Density Parity Check (LDPC). For example, a FEC code might interleave 10 binary BCH codes together. An appropriate choice of field space and parity bits might trade desired coding gain against encoding and decoding complexity.

Figure 11:
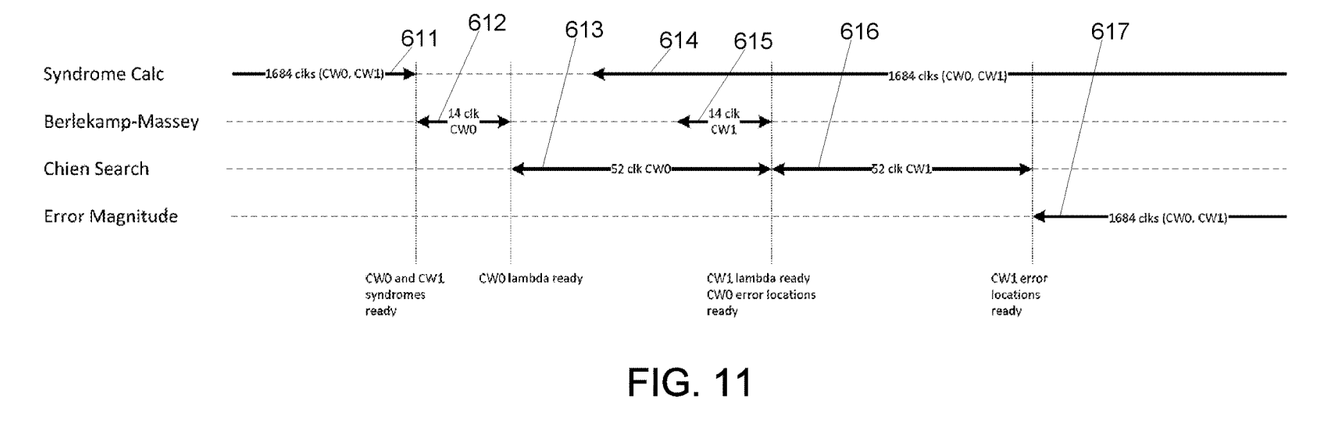
FIG. 11 is a diagram illustrating sequencing of process blocks of the decoder architecture of FIG. 10.

FIG. 11 is a diagram illustrating an example sequencing of process blocks of the decoder architecture 500 (FIG. 8). The diagram shows both the sequential and parallel decoding of both received interleaved codewords (CW0 and CW1).

In FIG. 11, syndrome calculation 611, 614 is performed by block 512 (FIG. 10). It evaluates the received polynomial at the 28 consecutive roots of alpha, starting at alpha0, and is implemented on a symbol by symbol basis using the classic Homer's method. All syndromes are reset to 0 on an expected TRS SAV (as generated by the internal flywheel) and each incoming subsequent symbol is added to running syndrome multiplied by the appropriate alpha value. The syndrome calculation circuit 512 (FIG. 10) may calculate the full syndromes for both interleaved codewords by sharing the Galois multipliers and storing the running syndrome results in two sets of flipflops.

The Berlekamp Massey (BM) circuit 511 (FIG. 10) is a step implemented to locate a transmission error in a received codeword. It is implemented 612, 615 (FIG. 11) using an inversion-less algorithm in a systolic array. Sequential elements are inserted in the systolic array such that each clock cycle will step through two iterations of the algorithm for a total of 14 clock cycles required to complete the calculation of the lambda polynomial and corresponding omega polynomial.

The Chien search 613, 615 is implemented by block 513 (FIG. 10) as a series of term accumulators followed by XOR trees to implement the evaluation of the lambda polynomial at each alpha value. The initial values loading in the term accumulators may be scaled accordingly to account for the shortening of the RS code. As such, only valid codeword error locations might be evaluated and the total Chien search times reduced. In addition the Chien circuit 513 (FIG. 10) might be parallelized by a factor of 16 in order to reduce the time required to complete the full search. Given that there are 832 alpha locations to evaluate and a folding factor of 16, total Chien search time is 52 clock cycles. The Chien search circuit 513 outputs all found error positions to be used by the error magnitude calculation. Decoding failure may be verified during the Chien search 613, 616 by comparing the number of detected polynomial roots to the degree of the input lambda polynomial. The correction logic may use the decoding failure detection to inhibit erroneous data correction when the number of errors exceeds the correction capabilities of the code.

Error magnitude calculation 617 is implemented by block 514 (FIG. 10) using a series of term accumulators in a similar fashion as the Chien search circuit 513. A term accumulation circuit used by the error magnitude module 514 may have two running accumulators used for the error calculation of both interleaved codewords.

The example system 100 (and its attendant method) makes use of unused bandwidth found in the blanking time of a line 30 of video data 12 in order to transmit additional FEC parity information. The transmitted FEC parity data may be used to correct transmission errors and thereby improve the quality of the received video signal as well as increase the possible transmission distance. This might provide advantages over typical video transmission systems, including the following:

Improved transmission reach: The ability to correct errors allows a video signal to be transmitted farther while maintaining a constant image quality.

Improved image quality: Given a constant transmission distance, the above systems and methods may provide better image quality at the receiver relative to a comparable device without FEC capabilities. In addition, ancillary data and video synchronization might be received more reliably.

Design trade-offs: The above systems and methods as described above might provide an additional degree of freedom to system designers when specifying video transmission products. Designers might balance the gains afforded by the additional error corrections against other design considerations such as overall complexity, power, operating conditions, etc.

Interoperability: Reallocating unused and available bandwidth found in the video blanking times might allow the example system to be used in existing video systems without modification. Existing and legacy products might be entirely interoperable with the system as long as data found in the video blanking time is ignored and unused. A legacy receiver might simply ignore the FEC data inserted into the blanking segment by an enabled transmitter. Similarly, a legacy transmitter would not include FEC data into the blanking segment. An enabled receiver might detect the missing FEC data and disable the error correction functions.

Standards compliant: By reallocating unused bandwidth in the blanking time of a video signal and transmitting FEC parity information in a valid format, the system might be fully implemented within the scope of existing video transmission standards.

Easily disabled: Since the FEC engine might reallocates bandwidth in the blanking segment, the FEC function might be easily disabled if ancillary bandwidth is needed. The FEC functions might be implemented either statically or dynamically.

Adding FEC protection to a video signal might improve the effective signal to noise ratio (SNR) of the transmitted signal. This might allow a video signal to be transmitted farther while maintaining a constant error rate (i.e. constant video quality over longer reaches). Conversely, improved effective SNR provided by this system might also provide increased channel capacity and better performance at higher data rates, thus improving the video quality at higher transmission rates required by more recent video standards.

The system 100 might provide increased signal reach and higher data rates without reducing the quality of the received video signal. Also, the gain provided by error correction might be used by a designer to ease some of the design constrains required to achieve a level of performance using only analog techniques.

The components and procedures described above provide examples of elements recited in the claims. They also provide examples of how a person of ordinary skill in the art can make and use the claimed invention. They are described here to provide enablement without imposing limitations that are not recited in the claims. In some instances in the above description, a term is followed by an equivalent or alternate term enclosed in parentheses.

The invention claimed is:

1. A method performed by a transmitter of a raster-type video signal, the method includes:

performing, for each one of a plurality of active video segments of a frame of the video signal:
deriving redundant data from the respective active video segment; and
inserting the redundant data into a horizontal blanking segment of the video signal without modifying the active video segments;
wherein the redundant data, that is inserted in the respective blanking segment, is derived also from data in a previous blanking segment; and
wherein the blanking segment, into which the redundant data is inserted, follows the active video segment from which the redundant data is derived or precedes the active video segment from which the redundant data is derived.

2. The method of claim 1, wherein the redundant data comprises forward error correction (FEC) data, and the deriving of the redundant data comprises calculating the FEC data.

3. The method of claim 1, wherein the redundant data that is inserted in the respective blanking segment is derived also from ancillary data in the same blanking segment.

4. The method of claim 1, wherein the blanking segment, into which the redundant data is inserted, follows the active video segment from which the redundant data is derived.

5. The method of claim 1, wherein the blanking segment, into which the redundant data is inserted, precedes the active video segment from which the redundant data is derived.

6. The method of claim 1, wherein the blanking segment, into which the redundant data is inserted, includes ancillary data.

7. The method of claim 1, wherein the inserting includes inserting, into the respective blanking segment, redundant data derived from two or more active video segments.

8. A transmitter comprising:
a redundant-data deriver configured to derive redundant data from each of a plurality of active video segments of a frame of a video signal; and
a redundant-data inserter configured to insert, for each of the active video segments, the respective redundant data into a blanking segment of the video signal without modifying the active video segments, to yield an output video signal;
wherein the redundant data, that is inserted in the respective blanking segment, is derived also from data in a previous blanking segment; and
wherein the blanking segment, into which the redundant data is inserted, follows the active video segment from which the redundant data is derived or precedes the active video segment from which the redundant data is derived.

9. The transmitter of claim 8, wherein the redundant data comprises forward error correction (FEC) data, the redundant-data deriver is a FEC parity calculator, and the deriving of the redundant data comprises calculating the FEC data.

10. The transmitter of claim 8, wherein the redundant data, that is inserted in the respective blanking segment, is derived also from ancillary data in the same blanking segment.

11. The transmitter of claim 8, wherein the blanking segment, into which the redundant data is inserted, follows the active video segment from which the redundant data is derived.

12. The transmitter of claim 8, wherein the blanking segment, into which the redundant data is inserted, precedes the active video segment from which the redundant data is calculated derived.

13. The transmitter of claim 8, wherein the blanking segment, into which the redundant data is inserted, includes ancillary data.

14. The transmitter of claim 8, wherein the inserting includes inserting, into the respective blanking segment, redundant data derived from two or more active video segments.

15. A method performed by a transmitter of a raster-type video signal, the method includes:
performing, for each one of a plurality of active video segments of a frame of the video signal:
deriving redundant data from the respective active video segment; and
inserting the redundant data into a horizontal blanking segment of the video signal without modifying the active video segments;
wherein the redundant data, that is inserted in the respective blanking segment, is derived also from ancillary data in the same blanking segment; and
wherein the blanking segment, into which the redundant data is inserted, follows the active video segment from which the redundant data is derived or precedes the active video segment from which the redundant data is derived.

16. A transmitter comprising:
a redundant-data deriver configured to derive redundant data from each of a plurality of active video segments of a frame of a video signal; and
a redundant-data inserter configured to insert, for each of the active video segments, the respective redundant data into a blanking segment of the video signal without modifying the active video segments, to yield an output video signal;
wherein the redundant data, that is inserted in the respective blanking segment, is derived also from ancillary data in the same blanking segment; and
wherein the blanking segment, into which the redundant data is inserted, follows the active video segment from which the redundant data is derived or precedes the active video segment from which the redundant data is derived.

* * * * *